United States Patent
Boggs

[19]

[11] Patent Number: 6,161,297
[45] Date of Patent: Dec. 19, 2000

[54] SQUARE HOLDING DEVICE

[76] Inventor: Jeffrey O. Boggs, P.O. Box 1908, Wolfeboro, N.H. 03894

[21] Appl. No.: 09/124,727

[22] Filed: Jul. 30, 1998

[51] Int. Cl.[7] .................................................... G01B 5/25
[52] U.S. Cl. ............................ 33/529; 33/484; 33/412; 33/474
[58] Field of Search ........................ 33/529, 430, 474, 33/484, 490, 520, 555.3, 412

[56] References Cited

U.S. PATENT DOCUMENTS

| | | | |
|---|---|---|---|
| 1,536,576 | 5/1925 | Fields | 33/555.3 |
| 1,549,947 | 8/1925 | Wolfe | 33/555.3 |
| 1,971,628 | 8/1934 | Sutterlin | 33/555.3 |
| 2,303,007 | 11/1942 | Thomason | 33/555.3 |
| 2,461,783 | 2/1949 | Stark | 33/529 |
| 2,607,126 | 8/1952 | Sekki | 33/529 |
| 4,375,724 | 3/1983 | Brock | 33/529 |
| 5,038,487 | 8/1991 | Johnson | 33/484 |

*Primary Examiner*—Christopher W. Fulton

[57] ABSTRACT

A pipe fitting tool is provided including a square having a pair of planar rectangular strips coupled at ends thereof in perpendicular relationship. Also included is at least one holder having a pair of lower surfaces which form an angle with respect to each other. The holder further has a top surface secured to the square such that the same resides in a plane in which an intersection of the lower linear surfaces resides.

1 Claim, 2 Drawing Sheets

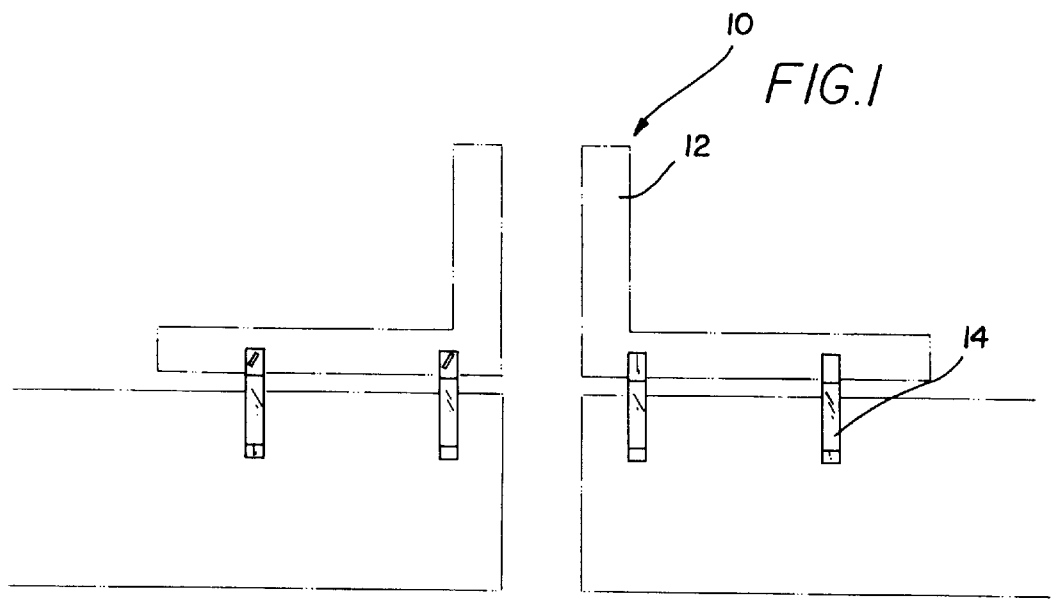
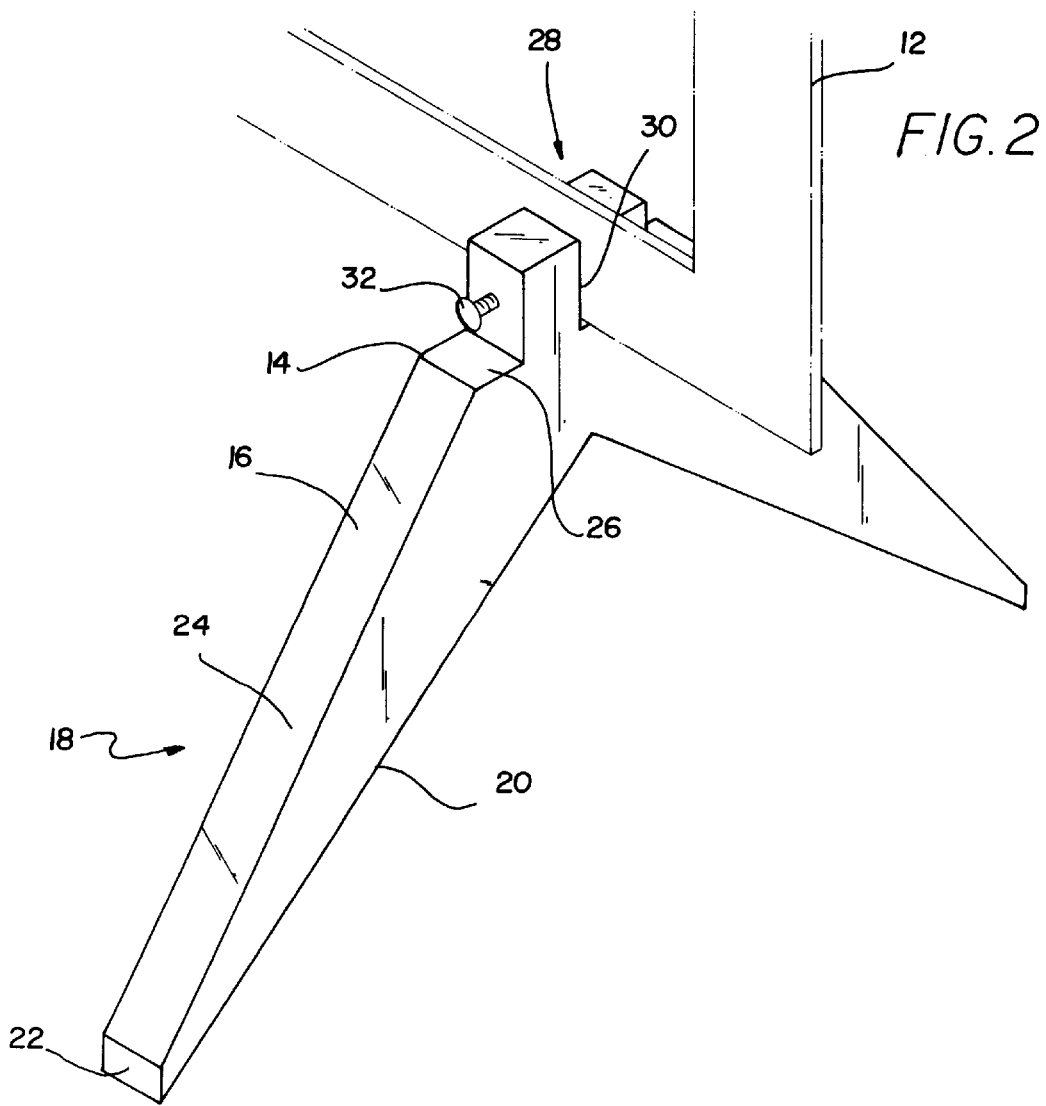

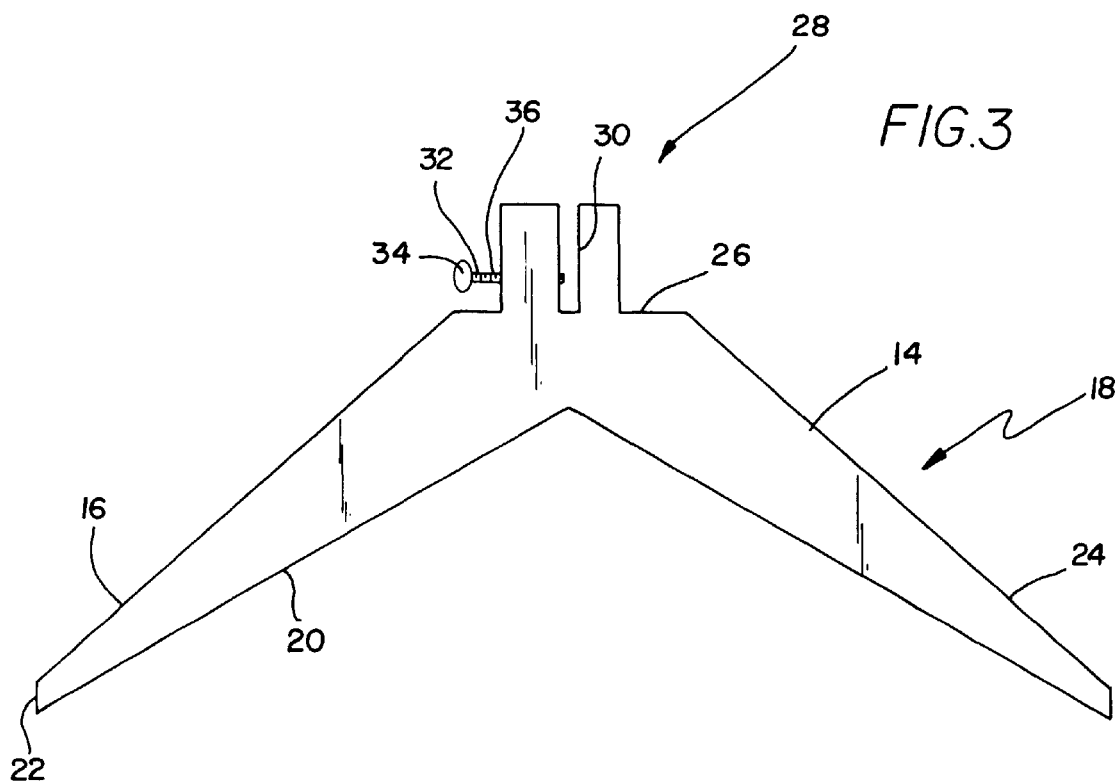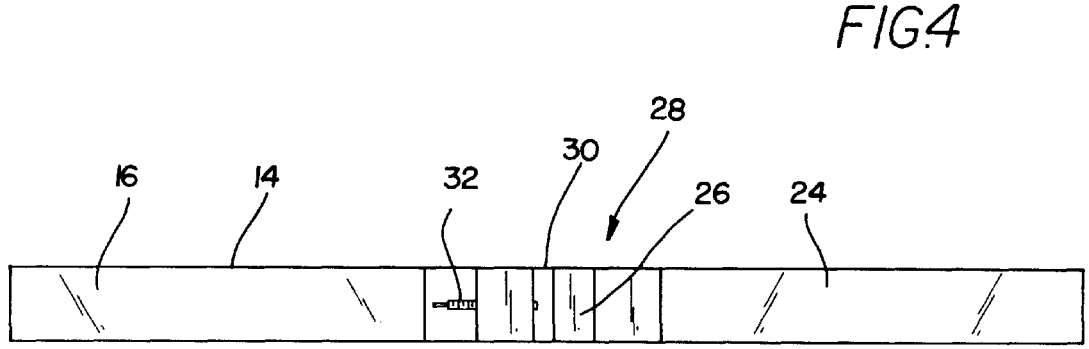

SQUARE HOLDING DEVICE

BACKGROUND OF THE INVENTION

1. Field of the Invention

The present invention relates to square brackets and more particularly pertains to a new square holding device for aligning a square along a center line of a pipe.

2. Description of the Prior Art

The use of square brackets is known in the prior art. More specifically, square brackets heretofore devised and utilized are known to consist basically of familiar, expected and obvious structural configurations, notwithstanding the myriad of designs encompassed by the crowded prior art which have been developed for the fulfillment of countless objectives and requirements.

Known prior art square holding device and the like include U.S. Pat. Nos. 4,380,872; 4,497,119; 3,670,418; 4,388,765; 3,331,134; and 2,370,741.

In these respects, the square holding device according to the present invention substantially departs from the conventional concepts and designs of the prior art, and in so doing provides an apparatus primarily developed for the purpose of aligning a square along a center line of a pipe.

SUMMARY OF THE INVENTION

In view of the foregoing disadvantages inherent in the known types of square brackets now present in the prior art, the present invention provides a new square holding device construction wherein the same can be utilized for aligning a square along a center line of a pipe.

The general purpose of the present invention, which will be described subsequently in greater detail, is to provide a new square holding device apparatus and method which has many of the advantages of the square brackets mentioned heretofore and many novel features that result in a new square holding device which is not anticipated, rendered obvious, suggested, or even implied by any of the prior art square brackets, either alone or in any combination thereof.

To attain this, the present invention is adapted for use with a square including a pair of planar rectangular strips coupled at ends thereof in perpendicular relationship. The present invention includes a plurality of holders each having a planar front face, a planar rear face and a peripheral wall. Such peripheral wall is formed between the front face and rear face in perpendicular relationship therewith. As shown in FIG. 3, the peripheral wall includes a lower extent with a pair of lower linear surfaces forming a 120 angle with respect to each other. The lower extent of the peripheral wall further includes a pair of short parallel side faces and a pair of tapered upper linear surfaces. Such taper affords legs each with an outboard end having a width which is less than that of an inboard end of each leg. The lower extent of the peripheral wall further has a horizontally oriented top linear surface. The peripheral wall of each holder further includes an upper extent taking the form of a rectangular block formed on the top linear surface of the lower extent. The block is defined by a pair of parallel side linear surfaces and a top linear surface with a rectangular cut out formed therein. The cut out functions for releasably receiving the square therein. In the preferred embodiment, the cut out extends along an entire length of the upper extent. Further, the cut out resides along a line which intersects an intersection of the lower linear surfaces of the lower extent of the peripheral wall. Finally, a set screw is provided including an outboard end with a disk-shaped tab formed thereon. The set screw further has an inboard end with threaded grooves formed thereon. The set screw is thus adapted for screwably engaging a threaded aperture formed in one of the side linear surfaces of upper extent of the peripheral wall of each of the holders. In use, the set screw is adapted for engaging the square situated within the rectangular cut out.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new square holding device apparatus and method which has many of the advantages of the square brackets mentioned heretofore and many novel features that result in a new square holding device which is not anticipated, rendered obvious, suggested, or even implied by any of the prior art square brackets, either alone or in any combination thereof.

It is another object of the present invention to provide a new square holding device which may be easily and efficiently manufactured and marketed.

It is a further object of the present invention to provide a new square holding device which is of a durable and reliable construction.

An even further object of the present invention is to provide a new square holding device which is susceptible of a low cost of manufacture with regard to both materials and labor, and which accordingly is then susceptible of low prices of sale to the consuming public, thereby making such square holding device economically available to the buying public.

Still yet another object of the present invention is to provide a new square holding device which provides in the apparatuses and methods of the prior art some of the advantages thereof, while simultaneously overcoming some of the disadvantages normally associated therewith.

Still another object of the present invention is to provide a new square holding device for aligning a square along a center line of a pipe.

Even still another object of the present invention is to provide a new square holding device that includes a square having a pair of planar rectangular strips coupled at ends thereof in perpendicular relationship. Also included is at least one holder having a pair of lower surfaces which form an angle with respect to each other. The holder further has a top surface secured to the square such that the same resides in a plane in which an intersection of the lower linear surfaces resides.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new square holding device in use.

FIG. 2 is a perspective view of one of the holders of the present invention.

FIG. 3 is a front view of one of the holders of the present invention.

FIG. 4 is a top view of one of the holders of the present invention.

DESCRIPTION OF THE PREFERRED EMBODIMENT

With reference now to the drawings, and in particular to FIGS. 1 through 4 thereof, a new square holding device embodying the principles and concepts of the present invention and generally designated by the reference numeral 10 will be described.

The present invention, designated as numeral 10, is adapted for use with a square 12 including a pair of planar rectangular strips coupled at ends thereof in perpendicular relationship. The present invention includes a plurality of aluminum holders 14 each having a planar front face, a planar rear face and a peripheral wall. Ideally, the peripheral wall has a width of about 1 and ¼ inches. Such peripheral wall 16 is formed between the front face and rear face in perpendicular relationship therewith.

As shown in FIG. 3, the peripheral wall includes a lower extent 18 with a pair of lower linear surfaces 20 forming a 120 angle with respect to each other. The lower extent of the peripheral wall further includes a pair of short parallel side faces 22 and a pair of tapered upper linear surfaces 24. Such taper affords legs each with an outboard end having a width which is less than that of an inboard end of each leg. The lower extent of the peripheral wall further has a horizontally oriented top linear surface 26.

The peripheral wall of each holder further includes an upper extent 28 taking the form of a rectangular block formed on the top linear surface of the lower extent. Ideally, the block has a width which is about ½ that of the top linear surface of the lower extent of the peripheral wall for defining a pair of right angle shelves. The block is defined by a pair of parallel side linear surfaces and a top linear surface with a rectangular cut out 30 formed therein. The cut out functions for releasably receiving the square therein. In the preferred embodiment, the cut out extends along an entire length of the upper extent. Further, the cut out resides along a line which intersects an intersection of the lower linear surfaces of the lower extent of the peripheral wall.

Finally, a set screw 32 is provided including an outboard end with a disk-shaped tab 34 formed thereon. The set screw further has an inboard end 36 with threaded grooves formed thereon. The set screw is thus adapted for screwably engaging a threaded aperture formed in one of the side linear surfaces of upper extent of the peripheral wall of each of the holders. In the preferred embodiment, a side of the block in which the set screw is situated is larger than the remaining side.

In use, the set screw is adapted for engaging the square situated within the rectangular cut out. In the preferred embodiment, a pair of holders are employed at opposite ends of one of the strips of the square. After such engagement is accomplished, the user may place the lower surfaces of the holders both in abutment with a pipe. As such, the square resides within a plane which lies along a center axis of the pipe.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pipe fitting tool comprising:
    a square including a pair of planar rectangular strips coupled at ends thereof in perpendicular relationship;
    a pair of holders holding the square, each holder including a central extent and a pair of legs extending outwardly from the central extent, each of the legs having an upper surface and a lower surface, the lower surfaces of the legs forming an angle with respect to each other and a top surface secured to the square such that the square resides in a plane in which an intersection of the lower surfaces resides;
    wherein the upper surface and the lower surface of each of the legs converge toward each other such that a width of each of the legs tapers smaller toward an outboard end of each leg relative to an inboard end of each leg for minimizing weight of the holder away from the central extent and enhancing stability of the holder when the lower surfaces are rested on an upper surface of a pipe;

wherein the holder includes a slot formed in the central extent for releasably receiving the square, the slot being open upwardly for insertion of the square;

wherein a couple further secures the square to the holder;

wherein the couple includes a screw;

wherein the angle is approximately 120 degrees; and wherein the lower surfaces of the legs are substantially planar.

* * * * *